United States Patent [19]

Bernt et al.

[11] Patent Number: 5,133,179
[45] Date of Patent: Jul. 28, 1992

[54] JUNCTION LINK AND METHOD FOR FORMING

[75] Inventors: Jorgen O. Bernt, Oakville; Barry C. Forster, Mississauga, both of Canada

[73] Assignee: J. O. Bernt & Associates Limited, Mississauga, Canada

[21] Appl. No.: 767,156

[22] Filed: Sep. 30, 1991

[51] Int. Cl.$^5$ .............. B11L 13/00; F16G 15/02
[52] U.S. Cl. ........................... 59/31; 59/78; 59/84
[58] Field of Search ................ 59/84, 85, 78, 31

[56] References Cited

U.S. PATENT DOCUMENTS

| 995,565 | 6/1911 | Rappos | 59/31 |
| 1,412,724 | 4/1922 | Tobin | 59/85 |
| 1,906,570 | 5/1933 | Gilbert et al. | 59/84 |
| 4,776,454 | 10/1988 | Momose | 59/85 |

FOREIGN PATENT DOCUMENTS

| 0068582 | 10/1892 | Fed. Rep. of Germany | 59/85 |
| 3149970 | 7/1983 | Fed. Rep. of Germany | 59/85 |
| 3324082 | 1/1985 | Fed. Rep. of Germany | 59/85 |
| 0008399 | 7/1885 | United Kingdom | 59/85 |

Primary Examiner—David Jones

[57] ABSTRACT

The repair link is a C-shaped member and a junction member, the junction member having enlarged tongues with narrower roots and the C shaped member is complementary. Welding to hold the junction member in place preferably is caused to adhere to the C-shaped member rather than the junction member.

6 Claims, 4 Drawing Sheets

JUNCTION LINK AND METHOD FOR FORMING

This invention relates to a junction link and to a method for forming such link for use in kilns and other applications where a simple, strong and easily connected link is required. Uses of the link include the connection of a hanger to a chain in a kiln, the connection of two lengths of chain and similar uses. The link of the invention will be made of iron or steel.

A link may be considered a closed ring and the line tracing the centre of the material about the ring can be considered as generally defining a median plane called the 'plane of the link' herein.

In use, the junction link may often be used in locations where otherwise a special shackle and separate attachment procedures must be used, the use of the junction link involving a considerable saving in cost and convenience.

The link provides a C-shaped member defining mutually facing end faces and a junction member connectable to form a closed ring; with the junction member having enlarged tongues with narrower roots and being slidable into complementarily shaped portions of the C-shaped member to form, in assembled position, a link much as connecting jig-saw puzzle pieces. The direction of sliding is perpendicular to the plane of the ring. At each end of the junction member, surfaces of such member are shaped to form a recess open outwardly and open toward said end faces. Such recess is filled (or partially filled) with weld material fastening the junction member to the C-shaped member and completing the link. The major stresses on the link in use are exerted in the plane of the link on the faces of the enlarged portions of the tongues and corresponding grooves in the C-shaped member and are thus perpendicular to the potential direction for potential sliding removal of the junction member. Thus the stresses tending to cause removal of the junction member against the strength of the weld are relatively minor relative to the stresses in the plane of the link which latter will include stresses caused by the weight of any chain or other apparatus thereon and any added stresses due to the forces by particulate or other material on the chain.

In accord with a preferred aspect of the invention the sections of the tongues outside of the roots and their complementary grooves are surfaces of revolution being only tapered enough from a cylindrical shape to allow easy removal from the mold, the taper in the tongue therefore being in the insertion direction.

In a preferred aspect of the invention, the inside surface of the C-shaped member is shaped with the inside surface of the junction member to form a circle in the plane of the link to contribute to even wear about the link.

For added strength at the junction the link itself and the portion of the C-shaped member adjacent the link are thickened relative to the bight extent of the C-shaped member.

The junction member recesses at the two pairs of adjacent faces of the C-shaped member and the Junction member are adapted to contain the weld material and thus the wear on the weld material is less, in ordinary use, than if the weld material were exposed to more wearing contact with chains, particulate material, etc.

In a preferred variant of the invention the welding material adheres to the end faces of the C-shaped member and imperfectly if at all to the junction member. Thus the welding material adhering to the C-shaped member acts as a stop to prevent the junction member from sliding out of assembled position. Since the welding material in this preferred variant, is either not adherent to the junction member or imperfectly adherent so that the connection is easily fractured during the use of the link, the link does not form a rigid ring and is much less subject to damage or fracture under thermal or physical stresses. Even so, when the welding material is not adherent to the junction member, it is still adherent to the C-shaped member and hence acts as a stop to removal of the junction member.

In accord with the preferred variant of the invention described in the preceeding paragraph, there is a preferred method for forming the link which involves placing the link in assembled position and causing adherence of the welding material to the end faces of the C-shaped member while inhibiting the adherence of such welding material to the recess-defining surfaces of the Junction member. Preferably the inventive method is performed by coating the recess-defining surfaces with heat resistant insulating material so that the arc of the arc welder mainly or only reaches the C-shaped member end faces. Thus the welding material tends to adhere to the end faces and is inhibited from adherence to the junction member, recess defining surfaces.

In drawings which illustrate a preferred embodiment of the invention:

Figure 3:
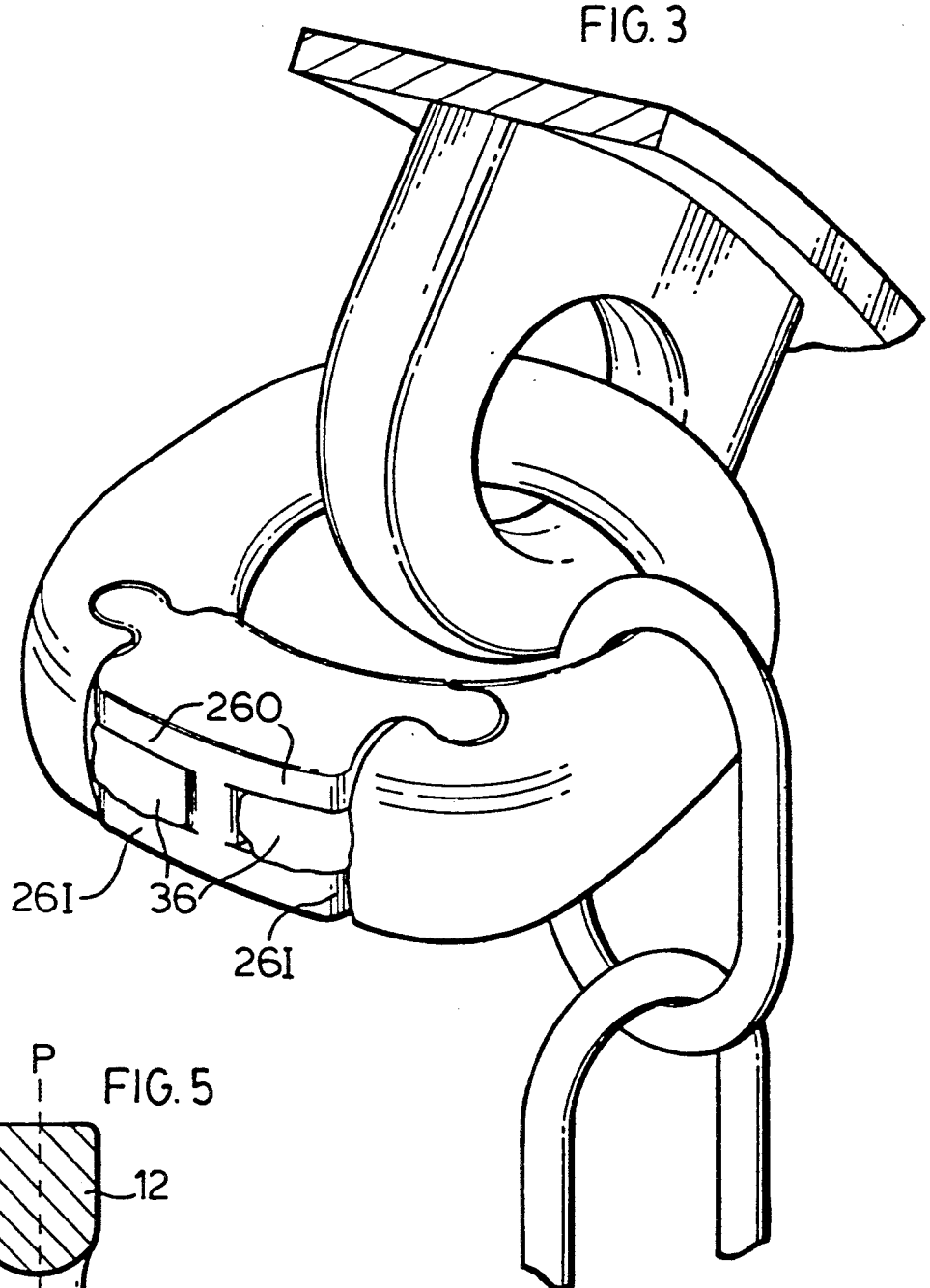
FIG. 3 shows a perspective view of the assembled link attached to a chain and hanger.

In the drawings is shown a C-shaped member 10 which cooperates with junction member 12 to form a complete repair link best shown in FIG. 3.

Figure 1:
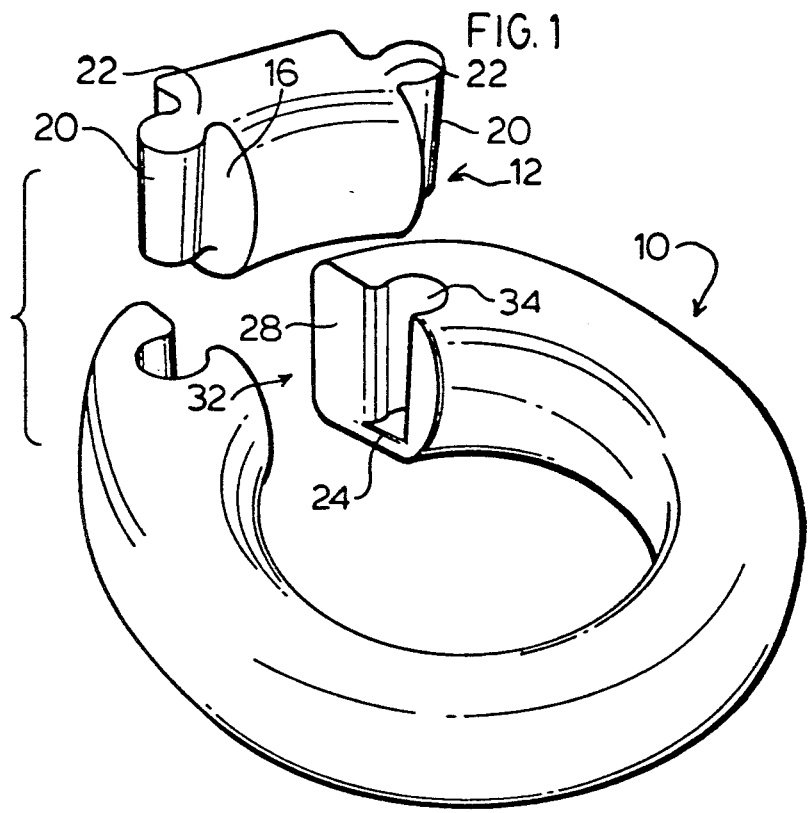
FIG. 1 is a perspective view of separated C-shaped and junction member.
Figure 2:
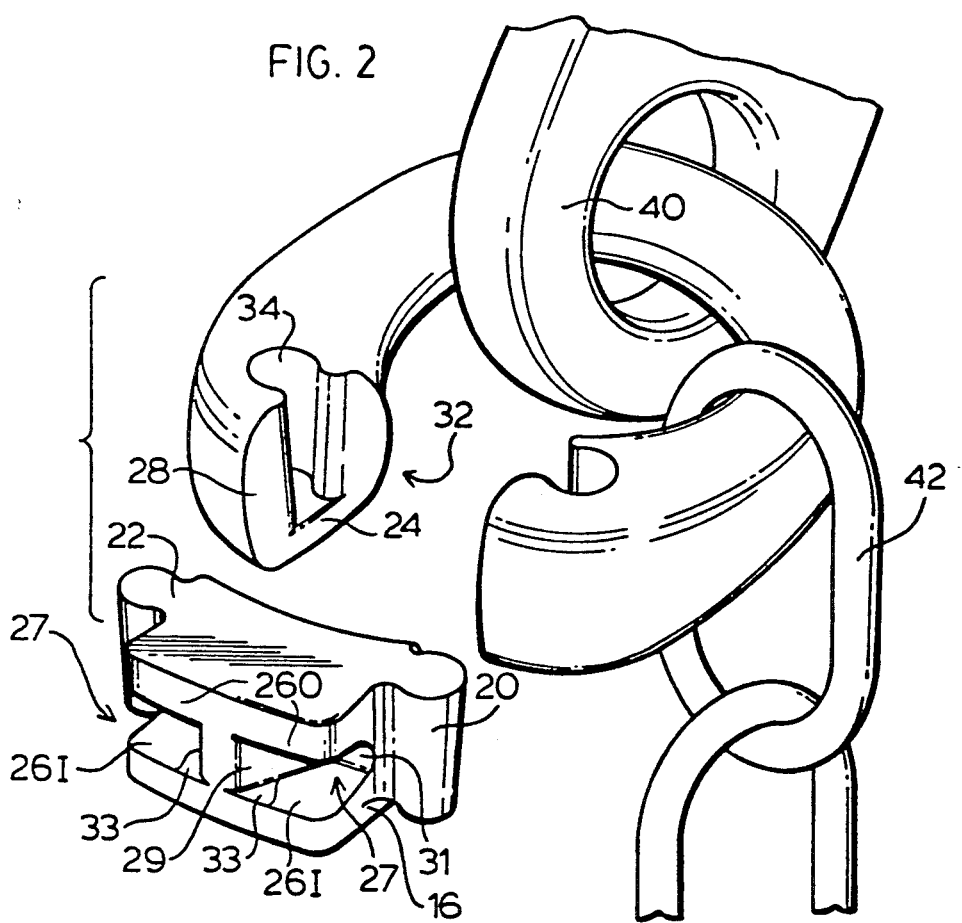
FIG. 2 is a perspective view of the separated members of FIG. 1 attached to a chain and hanger.
Figure 4:
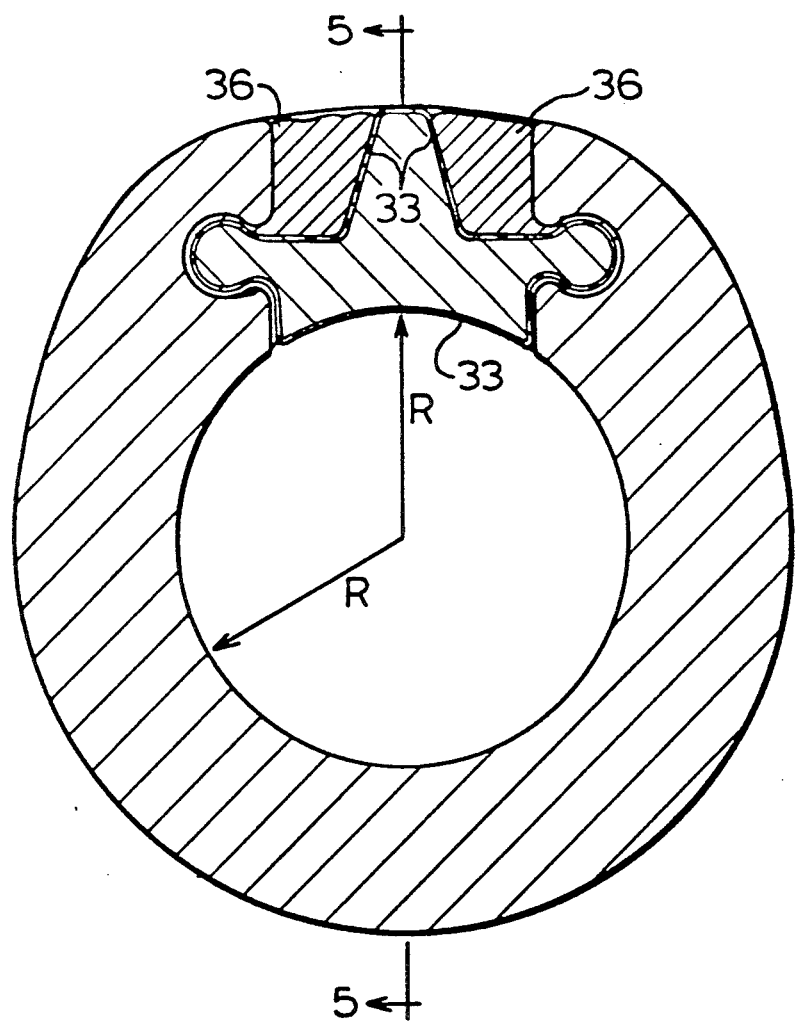
FIG. 4 is a section view of the assembled link taken in the plane of the link.

The junction link has a central extent of outside shape best shown in FIGS. 1 and 2 with an inside contour which is an arc of a circle when viewed perpendicular to the plane of the link. The Junction member in section has relatively rectilinear outer and side walls and an inside surface, which is an arc of a circle as best shown in FIG. 4.. The junction link 12 defines outwardly facing end walls 16. Tongues 20 are formed on end walls 16 extending in the insertion direction of the link, that is perpendicular to the plane of the link. The tongues 20 are of circular section except where joined to the body of the link at thinner roots 22. The tongues 20 are almost cylindrical, tapering in the insertion direction of the junction member just sufficiently to allow easy removal of the member from a mold. In the opposite to the insertion direction the tongue is flush with the side walls of the junction member but in the insertion direction the tongue stops short of the corresponding side wall to accomodate or complement a web 24 in the C-shaped member.

The outer surface of the junction member is provided with recesses at each end open outwardly and to the ends of the junction member as best shown in FIG. 2. The recessed portions are respectively open to face 28 of the C-shaped member to form a recess to receive weld material 36 to stop removal of the junction member from the C-shaped member. Please note that recesses 27 are each defined by the facing surfaces of webs 26I (in the insertion direction for the junction link) and web 260 (in the removal direction for the junction link), by end surfaces 29 and root surface 31. In accord with the preferred method of making the completed link, the surfaces of webs 26I and 260 and surfaces 29 and 31 (as well as the remainder of the junction link) are covered with a heat resistant insulating coating 33 to inhibit conduction to a welding arc For clarity of illustration the insulating coating 33 is indicated only in FIG. 4 and partially in FIG. 2 although coating 33 preferably covers all the surfaces of the junction link. The C-shaped member has a central body or bight 30 roughly describing a circle in the plane of the link with mutually facing end faces 32. End faces 32 are shaped to be complementary to and to slidingly receive the junction member. Thus each free 32 is recessed to provide a groove 34 complementary to the tongues, closed at the end in the insertion direction by a web 24 which closes the end of the groove and forms a stop for the tongue 20 of the junction member in the insertion direction. Each of the junction member and the C-shaped member is a unitary molded iron or steel member. The grooves 34 of the C-shaped member are tapered to be complementary to and allow sliding insertion of the tongues 20.

Figure 5:
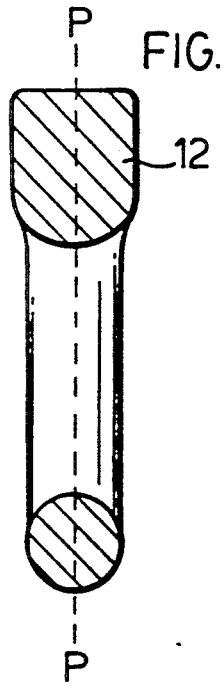
FIG. 5 is a vertical section along the lines 5—5 of FIG. 4 through the link taken in a plane perpendicular to the plane of the link.

FIG. 5 shows the line P—P corresponding to the plane of the link.

As shown in FIG. 5 the bight of the C-shaped link is of circular cross section. The predominate wear is on the inner portion of the surface facing the link opening. The C-shaped member is thickened adjacent its end faces 28 to form a section circular on the inside and rectilinear on the outside to smoothly match the contour of the junction member which complements it.

The assembled junction member and C-shaped member define an inside circle of radius R when viewed in the direction perpendicular to the link plane, as indicated in FIG. 4. The preferred inner circle shape tends to provide for even wear about the assembled link.

In assembly (FIG. 2) the C-shaped member is inserted through a hanger 40 aperture (or other aperture) and a link 42 of a chain to be joined (or other apparatus with an aperture). The junction member is then slid into place in the C-shaped member. The C-shaped member with the weld material 36 received in the recess 26 where it is, to some extent protected from the function and wear of impact from chain links, apparatus, etc. The welded link is shown in FIG. 3. The weld is sufficient to maintain the link closed under usual operating conditions. The heavy stresses on the link are radially outward in the plane of the link and bear on the faces defining the interlocking tongues and grooves. However, the forces perpendicular to the plane of the link which act against the strength of the weld are much less.

Figure 6:
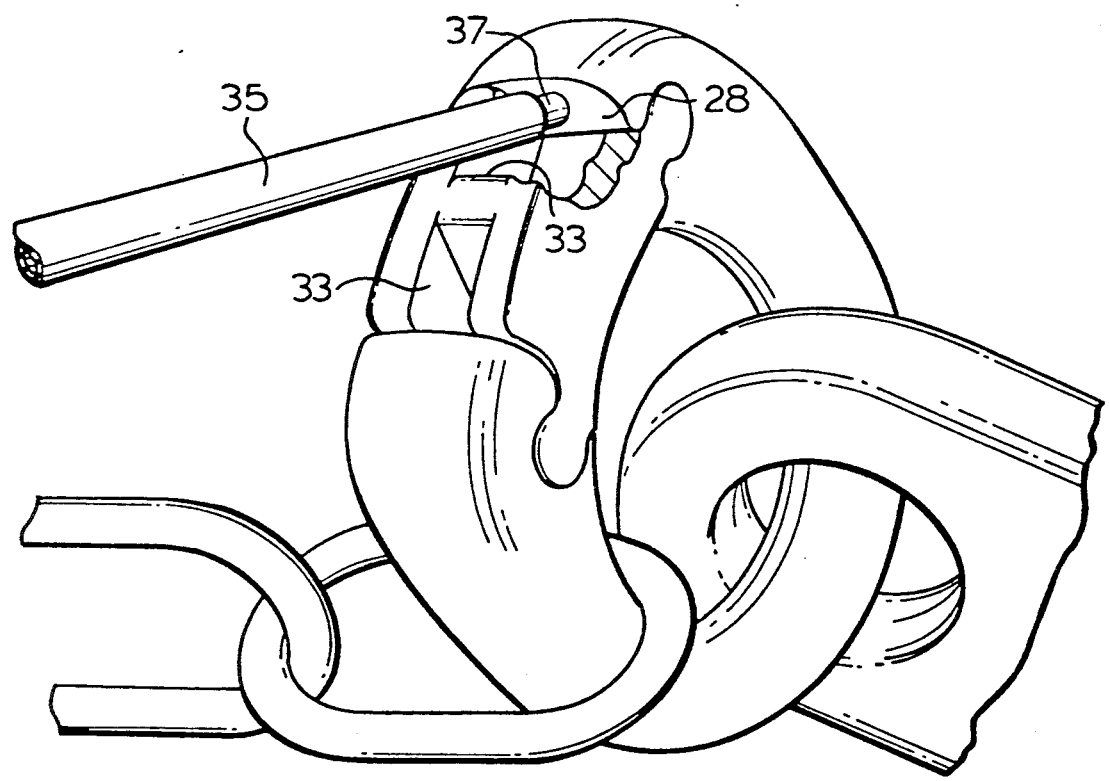
FIG. 6 illustrates the welding process of the link.

In the preferred method of making the link the junction member is covered with an electrical insulation layer 33 to inhibit the contact of a welding arc thereon. With the junction member inserted in the C-shaped member as shown in FIG. 6 the welding torch 35 is activated to form arc 37 and the welding material (not shown in FIG. 6) formed between the recess surfaces and the end face 28 of the C-shaped member. The material fills the space available from the inside to outside. Because of the insulating coating 33 the arc 37 "finds" the end face 28 of the C-shaped member but tends not to find the surfaces of webs 26I, 260 or surfaces 31 or 29. This is assisted by the fact that the torch 35 tip also has an insulating coating which tend to be removed only at the tip end near surface 39 (removal is by melting or vapourization) Hence the welding material 36 attaches or welds securely only to the C-shaped member and not to 26I, 260, 31 or 29. Insulating layer 33 may have some imperfections and there may be some adherence of the material 36 to the junction member surfaces this will be weak and tend to fracture when the link is subjected to thermal or physical stresses in use. Thus, with the preferred method the recess is defined by surfaces of the junction member only and the welding material attaches only or primarily to the C-shaped member. Thus in the assembled location of FIG. 3 the welding material 36 acts as a stop to removal of the junction link and specifically to any substantial movement of webs 26I. The junction member in use may be "loose" and have a slight movement or play relative to the C-shaped member but is still securely held by the stop formed by material 36. It is found that the junction member with such slight play forms with the C-shaped member a link better able to withstand thermal and physical stresses than a link where the junction member is welded to the C-shaped member to form a rigid ring. It will be noted that, with the inventive method the material 36 acts as a stop if web 26I is provided and 260 is omitted. However, it is preferred to provide web 260 as well to form a barrier to the welding material flow and to produce a link of better appearance.

FIGS. 2 and 3 show possible attitudes of hanger link and chain during connection to the link. Obviously in use, with stress on the chain the contact points of chain and hanger with the link will be diametrically opposed on the link and aligned with the chain direction.

The junction and C-shaped members may be designed so that the majority of the recess is defined by surfaces of the C-shaped member and, in any event, any shaping to provide that adjacent surfaces of the junction and C-shaped member define a recess at each end of the junction member is within the scope of the invention. However, with the preferred welding method the recess will be defined in the junction member only so that weld material 36 may attach to the C-shaped member only.

I claim:

1. Junction link comprising:
 a C-shaped member and a junction member having two free ends,
 the C-shaped member defining generally mutually facing free ends,
 the junction member being designed to provide surfaces which complement said C-shaped member and to form therewith a complete ring, in an assembled position said ring generally defining a plane,
 said junction member and said C-shaped member being designed to slide into assembled position in a direction generally perpendicular to the plane of the ring,
 said junction member defining at each free end, enlarged tongues having narrow roots and a thicker body and shaped to slide in said direction relative to said body,
 complementary groove-shaped members in said C-shaped members adapted to receive said tongues,
 means adapted, when said members are in assembled position, for preventing movement of said members out of assembled position, wherein said junction member is shaped to define a pair of recesses facing, in assembled position, the respective free end faces of said C-shaped member and wherein welding material is provided in said recesses adhering to said free ends.

2. Junction link as claimed in claim 1 wherein said tongues, outwardly of said roots are provided with a circular section.

3. Junction link as claimed in claim 2 wherein the ring defined by said C-shaped member and said junction member defines a circle when viewed in the direction perpendicular to the plane of the link.

4. Junction link as claimed in claim 1 wherein the ring defined by said C-shaped member and said junction member defines a circle when viewed in the direction perpendicular to said plane of the link.

5. Method of forming a junction link including the steps of:
providing a C-shaped member defining generally mutually facing free ends,
providing a junction member having two free ends designed to provide surfaces which complement said C-shaped member and in assembled position form therewith a complete ring, said ring defining the median plane,
where said junction member and said C-shaped member are designed to slide into assembled position in a direction generally perpendicular to said median plane,
where said junction member defines a pair of recesses which in the assembled position face the respective free ends of the junction member,
providing on the surfaces of said junction member which define said recesses, a heat resistant insulating coating sliding said junction member into assembled position with said C-shaped member,
with arc welding at least partially filling said recess with welding material primarily welded to said free ends.

6. Method of forming a junction link including the steps of:
providing a C-shaped member defining generally mutually facing free ends,
providing a junction member having two free ends designed to provide surfaces which complement said C-shaped member and in assembled position form therewith a complete ring, said ring defining a median plane,
where said junction member and said C-shaped member are designed to slide into assembled position in a direction generally perpendicular to said median plane,
wherein said junction member has surfaces defining a pair of recesses which in the assembled position face the respective free ends of the junction member, sliding said junction member into assembled position with said C-shaped member,
with arc welding, attaching welding material to said free ends within said recesses while inhibiting attachment of material to the surface defining said recess.

* * * * *